US010002059B2

(12) United States Patent
Antony

(10) Patent No.: US 10,002,059 B2
(45) Date of Patent: *Jun. 19, 2018

(54) SYSTEM AND METHOD FOR ASSIGNING MEMORY AVAILABLE FOR HIGH AVAILABILITY FAILOVER TO VIRTUAL MACHINES

(71) Applicant: VMWARE, INC., Palo Alto, CA (US)

(72) Inventor: Jinto Antony, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 415 days.

This patent is subject to a terminal disclaimer.

(21) Appl. No.: 13/916,615

(22) Filed: Jun. 13, 2013

(65) Prior Publication Data
US 2014/0372790 A1 Dec. 18, 2014

(51) Int. Cl.
*G06F 11/20* (2006.01)
*G06F 11/14* (2006.01)
*G06F 9/455* (2018.01)

(52) U.S. Cl.
CPC .......... *G06F 11/2043* (2013.01); *G06F 9/455* (2013.01); *G06F 9/45558* (2013.01); *G06F 11/1484* (2013.01); *G06F 11/2025* (2013.01); *G06F 11/2033* (2013.01); *G06F 11/2038* (2013.01); *G06F 11/2046* (2013.01); *G06F 11/2035* (2013.01); *G06F 2009/4557* (2013.01)

(58) Field of Classification Search
CPC ............. G06F 11/1484; G06F 11/2025; G06F 11/2038; G06F 11/2035; G06F 9/455; G06F 9/45558; G06F 11/2033; G06F 11/2043; G06F 11/2046
See application file for complete search history.

(56) References Cited

U.S. PATENT DOCUMENTS

| 6,075,938 | A | 6/2000 | Bugnion et al. |
| 7,831,634 | B2 * | 11/2010 | Petev et al. .................. 707/803 |
| 7,962,566 | B2 * | 6/2011 | Smits .................. H04L 67/1008 370/216 |
| 8,407,182 | B1 | 3/2013 | Rajaa et al. |
| 8,589,921 | B2 | 11/2013 | Heim |
| 8,631,131 | B2 | 1/2014 | Kenneth et al. |
| 8,806,266 | B1 * | 8/2014 | Qu ...................... G06F 11/1484 714/13 |
| 8,874,954 | B1 * | 10/2014 | Gupte ................. G06F 11/2028 714/1 |
| 8,930,947 | B1 | 1/2015 | Derbeko et al. |
| 9,009,416 | B1 | 4/2015 | Derbeko et al. |
| 9,043,533 | B1 | 5/2015 | Shajenko et al. |
| 9,053,033 | B1 | 6/2015 | Derbeko et al. |

(Continued)

OTHER PUBLICATIONS

Ye, Kejiang et al. Live Migration of Multiple Virtual Machines with Resource Reservation in Cloud Computing Environments. 2011. 2011 IEEE 4th International Conference on Cloud Computing. pp. 267-274.

*Primary Examiner* — Paul Contino

(57) ABSTRACT

Techniques for assigning memory available for high availability (HA) failover to virtual machines in a high availability (HA) cluster are described. In one embodiment, the memory available for HA failover is determined in at least one failover host computing system of the HA cluster. Further, the memory available for HA failover is assigned to one or more virtual machines in the HA cluster as input/output (I/O) cache memory.

29 Claims, 6 Drawing Sheets

(56) References Cited

U.S. PATENT DOCUMENTS

| | | |
|---|---|---|
| 9,104,529 B1 | 8/2015 | Derbeko et al. |
| 9,213,570 B2* | 12/2015 | Nelson ................. G06F 9/45558 |
| 9,235,524 B1 | 1/2016 | Derbeko et al. |
| 9,311,132 B1* | 4/2016 | Bernal ................. G06F 9/45558 |
| 9,367,452 B1* | 6/2016 | Clark ...................... G06F 12/08 |
| 9,367,453 B1* | 6/2016 | Clark ...................... G06F 12/08 |
| 2006/0010170 A1 | 1/2006 | Lashley et al. |
| 2006/0143609 A1* | 6/2006 | Stanev .............................. 718/1 |
| 2006/0155742 A1* | 7/2006 | Stanev .......................... 707/102 |
| 2008/0270674 A1 | 10/2008 | Ginzton |
| 2009/0172661 A1 | 7/2009 | Zimmer et al. |
| 2010/0070978 A1 | 3/2010 | Chawla et al. |
| 2010/0186011 A1* | 7/2010 | Magenheimer ................... 718/1 |
| 2010/0268881 A1 | 10/2010 | Galchev et al. |
| 2010/0332658 A1 | 12/2010 | Elyashev |
| 2011/0072138 A1 | 3/2011 | Canturk et al. |
| 2011/0185064 A1 | 7/2011 | Head et al. |
| 2011/0191627 A1* | 8/2011 | Koning et al. .................. 714/5.1 |
| 2011/0214005 A1* | 9/2011 | Biran .................... G06F 11/008 714/1 |
| 2011/0239215 A1 | 9/2011 | Sugai |
| 2012/0137062 A1* | 5/2012 | Arges .................. G06F 9/45558 711/113 |
| 2013/0086298 A1 | 4/2013 | Alanis et al. |
| 2013/0086582 A1 | 4/2013 | Cardona et al. |
| 2013/0283273 A1* | 10/2013 | Miyazaki ............ G06F 9/45533 718/1 |
| 2013/0339800 A1 | 12/2013 | Lange |
| 2014/0173213 A1* | 6/2014 | Beveridge ..................... 711/130 |
| 2014/0201302 A1* | 7/2014 | Dube et al. .................... 709/212 |
| 2014/0344504 A1* | 11/2014 | Luo et al. ...................... 711/103 |
| 2015/0178109 A1 | 6/2015 | Li et al. |
| 2015/0220442 A1 | 8/2015 | Phelan et al. |
| 2016/0092255 A1* | 3/2016 | Bernal ................ G06F 9/45558 718/1 |
| 2016/0179564 A1 | 6/2016 | Chen et al. |
| 2016/0210208 A1* | 7/2016 | Chen ................... G06F 11/1484 |

* cited by examiner

SYSTEM AND METHOD FOR ASSIGNING MEMORY AVAILABLE FOR HIGH AVAILABILITY FAILOVER TO VIRTUAL MACHINES

TECHNICAL FIELD

The present disclosure relates generally to virtual machines and, more particularly, to methods, techniques, and systems for assigning memory available for high availability (HA) failover to virtual machines in HA enabled clusters.

BACKGROUND

Computer virtualization is a technique that involves encapsulating a representation of a physical computing machine platform into a virtual machine (VM) that is executed under the control of virtualization software running on hardware computing platforms (also referred to herein as "hosts" or "servers"). A group of hardware computing platforms may be organized as a cluster to provide the hardware resources, such as memory, central processing units (CPUs) and so on, for virtual machines.

For virtual machines running mission critical applications, the speed of the storage system needs to be significantly fast. Even if a significant amount of memory and CPU resources are provisioned to the virtual machines running the mission critical applications, there can still be a storage bottle neck.

Figure 1:
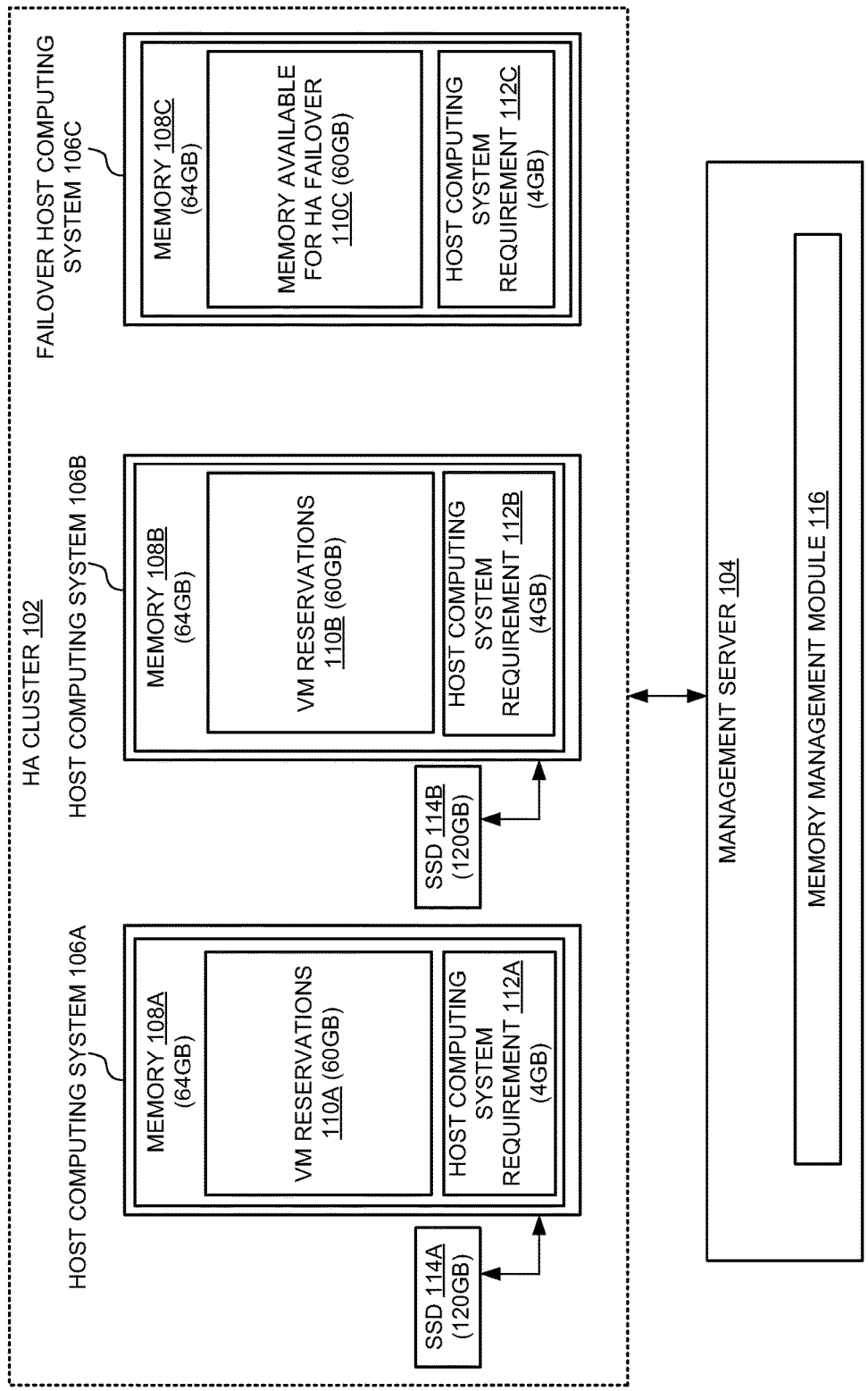
FIG. 1 is a block diagram of a high availability (HA) enabled cluster illustrating a failover host computing system having memory available for HA failover, according to an example embodiment.

The drawings described herein are for illustration purposes only and are not intended to limit the scope of the present subject matter in any way.

DETAILED DESCRIPTION

Embodiments described herein provide enhanced computer-based and network-based methods, techniques, and systems for assigning memory available for high availability (HA) failover to virtual machines in HA enabled clusters. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined by the appended claims.

The terms "HA enabled cluster" and "HA cluster" are used interchangeably throughout the document. The term "I/O cache memory" refers to cache memory that is assigned to virtual machines for carrying out all read operations to improve the input/output (I/O) performance. Further, the term "failover host computing system" refers to a host computing system that is designated/dedicated to accommodate the virtual machines on a failed host computing system in the HA cluster. Also, the term "memory available for HA failover" refers to memory that can be designated as being 'available' in the event of HA failover to accommodate affected virtual machines. In addition, the term "HA failover" refers to failure of at least one host computing system in the HA enabled cluster.

In a HA enabled cluster, it is ensured that sufficient resources (e.g., central processing units (CPUs), memory and the like) are available to provide failover protection and that virtual machine resource reservations are respected. In one example, a specific host computing system or host computing systems can be designated/dedicated as a failover host computing system(s). When the host computing system is designated as the failover host computing system, powering on of virtual machines on the failover host computing system cannot be enabled and virtual machines cannot be migrated to the failover host computing system. In other words, the failover host computing system effectively becomes a hot standby. When a host computing system fails in the HA cluster, virtual machines on the failed host computing system can be restarted on the designated failover host computing system(s). However, the memory and CPU resources in the failover host computing system(s) are not utilized unless there is a host computing system failure.

The proposed technique determines the memory available for HA failover in the failover host computing system(s) (e.g., ESX hosts) in the HA cluster and allocates the memory available for HA failover as input/output (I/O) cache memory for the virtual machines in the HA cluster using remote direct memory access (RDMA)-enabled network connection and/or other interconnection technologies. In other words, the I/O cache memory can be allocated from the memory available for HA failover in the failover host computing system(s) to the virtual machines which require high I/O performance. In addition, when there is a host computing system failure in the HA cluster, all the I/O cache memory allocated to the virtual machines from the memory available for HA failover will be reclaimed by the failover host computing system(s). When the HA cluster is back to normal (i.e., all the host computing systems are back to normal and functioning), the I/O cache memory can be dynamically created from the memory available for HA failover in the failover host computing system(s). A resource scheduling framework can manage the I/O cache memory allocation and de-allocation based on availability of the memory in the failover host computing system(s).

System Overview and Examples of Operation

FIG. 1 is block diagram 100 of high availability (HA) enabled cluster 102 illustrating failover host computing system 106C having memory available for HA failover 110C, according to an example embodiment. Particularly, FIG. 1 illustrates HA cluster 102 communicative with management server 104. In the example shown in FIG. 1, HA cluster 102 is described using two host computing systems 106A-B and a failover host computing system 106C, however, any number of host computing systems and any number of failover host computing systems can be configured in HA cluster 102. Furthermore, host computing systems 106A-B can be associated with solid-state drives (SSDs) 114A-B respectively. Also, host computing systems 106A-B include memories 108A-B respectively. As shown in FIG. 1, each of memories 108A-B includes a part of memory for host computing system requirements 112A-B and a part of memory for virtual machine (VM) reservations 110A-B. Further, failover host computing system 106C includes memory 108C, which includes a part of memory for host computing system requirement 112C and a part of memory available for HA failover 110C. VM reservations 110A-B represent memory that is collectively reserved for all VMs executing on each host computing system, and host computing system requirements 112A-C represent memory that is used by other host functions, such as memory used by the virtualization software layer (i.e., the hypervisor).

In the example shown in FIG. 1, each of memories 108A-C has a capacity of 64 GB. Out of 64 GB in each host computing system 106A-B, 4 GB is assigned for host computing system requirements 112A-B and 60 GB is assigned for virtual machine (VM) reservations 110A-B. Further, out of 64 GB in failover host computing system 106C, 4 GB is assigned for host computing system requirement 112C and 60 GB is available for HA failover 110C and can be used for assigning to virtual machines as the I/O cache memory. The drawings described herein are for illustration purposes only and are not intended to limit the scope of the present subject matter in any way.

Figure 3:
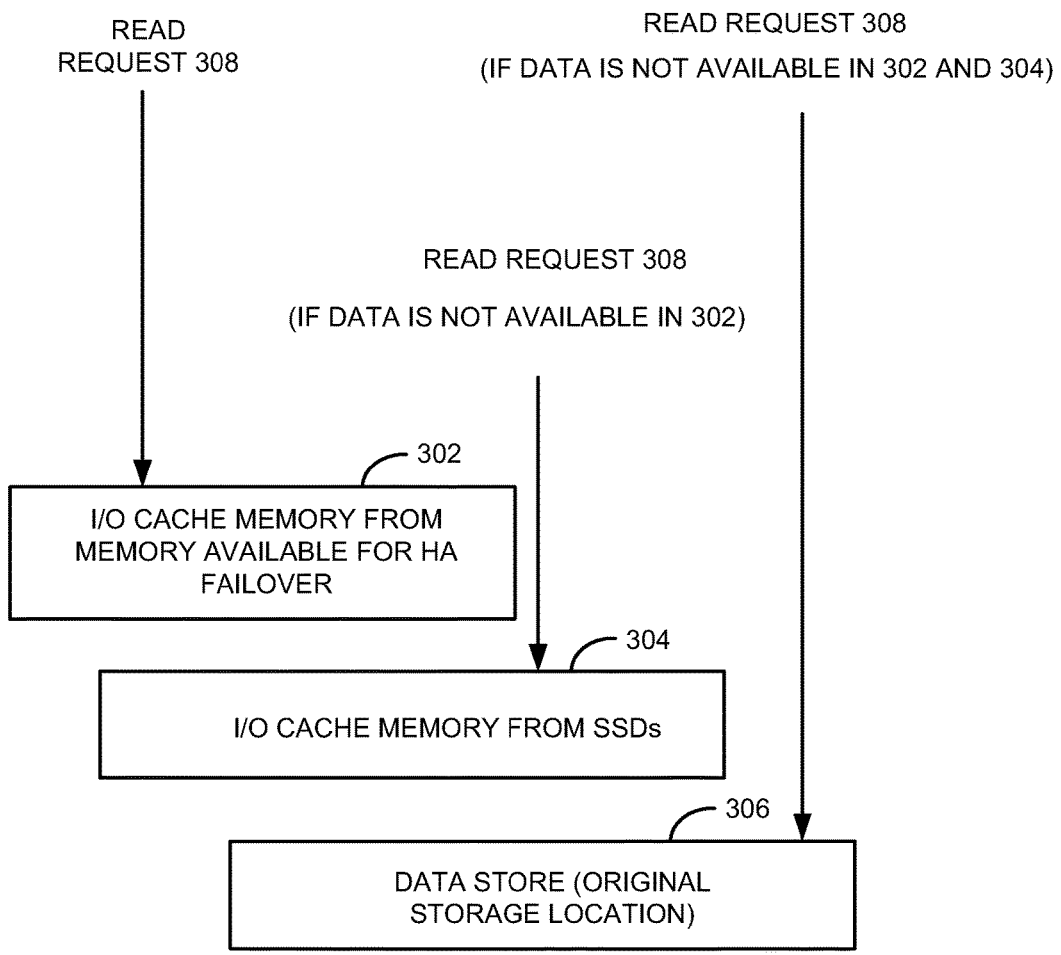
FIG. 3 is a block diagram illustrating a 3-tier hierarchical model for I/O cache memory, according to an example embodiment.

Further as shown in FIG. 1, management server 104 includes memory management module 116. Memory management module 116 determines virtual machines (e.g., running on host computing systems 106A-B) in HA cluster 102 which require input/output (I/O) cache memory. Further, memory management module 116 determines memory available for HA failover 110C in failover host computing system 106C. At a first level, memory management module 116 assigns memory available for HA failover 110C in failover host computing system 106C to virtual machines in the HA cluster 102 as the I/O cache memory based on the requirement of the virtual machines. At a second level, SSDs 114A-B can be used as the I/O cache memory (i.e., in addition to assigning the memory available for HA failover 110C) to provide a 3-tier hierarchical model for the I/O cache memory, which is illustrated in FIG. 3.

In one embodiment, memory management module 116 assigns memory available for HA failover 110C to the virtual machines running on host computing systems 106A-B as the I/O cache memory to improve the I/O performance. In an exemplary implementation, memory available for HA failover 110C can be assigned remotely to the virtual machines running on host computing systems 106A-B as the I/O cache memory using a remote direct memory access (RDMA)-enabled network connection, which is explained in detail in FIG. 2. For example, the RDMA-enabled network connection is a technique by which remote memory (e.g., of failover host computing system 106C) can be included in the local address space (e.g., of host computing systems 106A-B) via the network interface card (NIC).

Figure 2:
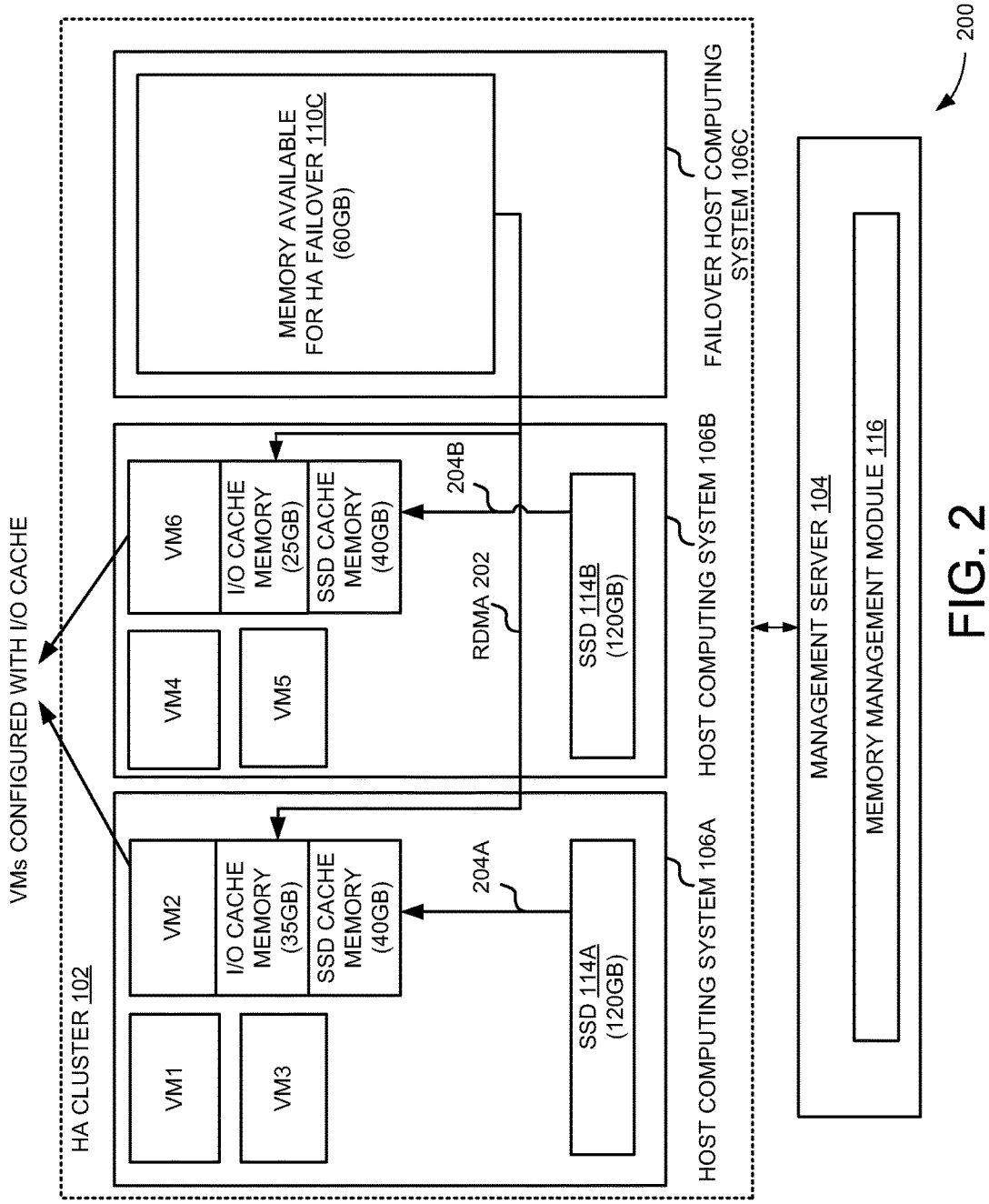
FIG. 2 is a block diagram of the HA enabled cluster illustrating allocating the memory available for HA failover and solid-state drives (SSDs) to virtual machines as input/output (I/O) cache memory, according to an example embodiment.

FIG. 2 is block diagram 200 of HA enabled cluster 102 illustrating allocating memory available for HA failover 110C and SSDs 114A-B to virtual machines as I/O cache memory, according to an example embodiment. Particularly, FIG. 2 illustrates assigning memory available for HA failover 110C in failover host computing system 106C remotely to the virtual machines running on host computing systems 106A-B as the I/O cache memory using RDMA-enabled network connection 202. In addition, FIG. 2 illustrates assigning SSDs 114A-B to virtual machines as the I/O cache memory in addition to assigning memory available for HA failover 110C to provide a 3-tier hierarchical model for the I/O cache memory, which is illustrated in FIG. 3.

In the example shown in FIG. 2, memory management module 116 determines that memory available for HA failover 110C in failover host computing system 106C is 60 GB. Further, memory management module 116 determines virtual machines VM2 and VM6 as requiring I/O cache memory. As shown in FIG. 2, host computing system 106A hosts virtual machines VM1, VM2, and VM3, and host computing system 106B hosts virtual machines VM4, VM5, and VM6.

Further, memory management module 116 assigns memory available for HA failover 110C to virtual machines VM2 and VM6 as the I/O cache memory if memory available for HA failover 110C is sufficiently available in failover host computing system 106C.

In the example shown in FIG. 2, out of 60 GB memory available for HA failover 110C in failover host computing system 106C, 35 GB and 25 GB are assigned remotely to virtual machines VM2 and VM6 respectively as the I/O cache memory using RDMA-enabled network connection 202. Alternatively, other interconnection technologies can also be used to assign memory available for HA failover 110C remotely to virtual machines VM2 and VM6 as the I/O cache memory.

Further, memory management module 116 can reclaim the I/O cache memory assigned from memory available for HA failover 110C in the event of the HA failover after discarding the I/O cache memory associated with virtual machines VM2 and VM6.

Also in the example shown in FIG. 2, memory management module 116 assigns 40 GB from SSDs 114A and 114B to respective virtual machines VM2 and VM6 (e.g., as shown by arrows 204A-B respectively) as the I/O cache memory (e.g., SSD cache memory as shown in FIG. 2), in addition to assigning memory available for HA failover 110C as the I/O cache memory, to provide a 3-tier hierarchical model for the I/O cache memory, which is explained in detail in FIG. 3.

FIG. 3 is block diagram 300 illustrating a 3-tier hierarchical model for I/O cache memory according to one embodiment. Particularly, FIG. 3 illustrates the 3-tier hierarchical model of the I/O cache memory created using memory available for HA failover in one or more dedicated failover computing systems at a first level, SSDs at a second level, and a data store at a third level. In operation, when read request 308 is issued, I/O cache memory 302 created using the memory available for HA failover is read for serving read request 308 at the first level. If data is not available in I/O cache memory 302 created using the memory available for HA failover, then I/O cache memory 304 created from the SSDs is read for serving the read request at the second level. If data is not available in both I/O cache memories 302 and 304, then the data needs to be recomputed or fetched from data store 306 (i.e., original storage location) at the third level.

Example embodiments described herein provide applications, tools, data structures and other support to implement memory management module 116 or similar logic to be used to dynamically allocate physical resources amongst multiple virtual machines based on activities occurring thereon. Other embodiments of the described techniques may be used for other purposes or in other contexts. For example, although described embodiments operate with respect to system or platform virtual machines (e.g., as managed by a hypervisor or virtual machine monitor), the techniques may be applicable with respect to process virtual machines (e.g., the Java virtual machine) or process scheduling at the operating system level. Virtual servers may also be governed by similarly dynamic resource allocation methods, including considerations such as what user groups or numbers of users are using a given virtual server and in what context.

Numerous specific details are set forth herein, such as data formats and code sequences, and the like, in order to provide a thorough understanding of the described techniques. The embodiments described also can be practiced without some of the specific details described herein, or with other specific details, such as changes with respect to the ordering of the logic, different logic, different architectures, or the like. Thus, the scope of the techniques and/or functions described are not limited by the particular order, selection, or decomposition of aspects described with reference to any particular routine, module, component, or the like.

Example Processes

Figure 4:
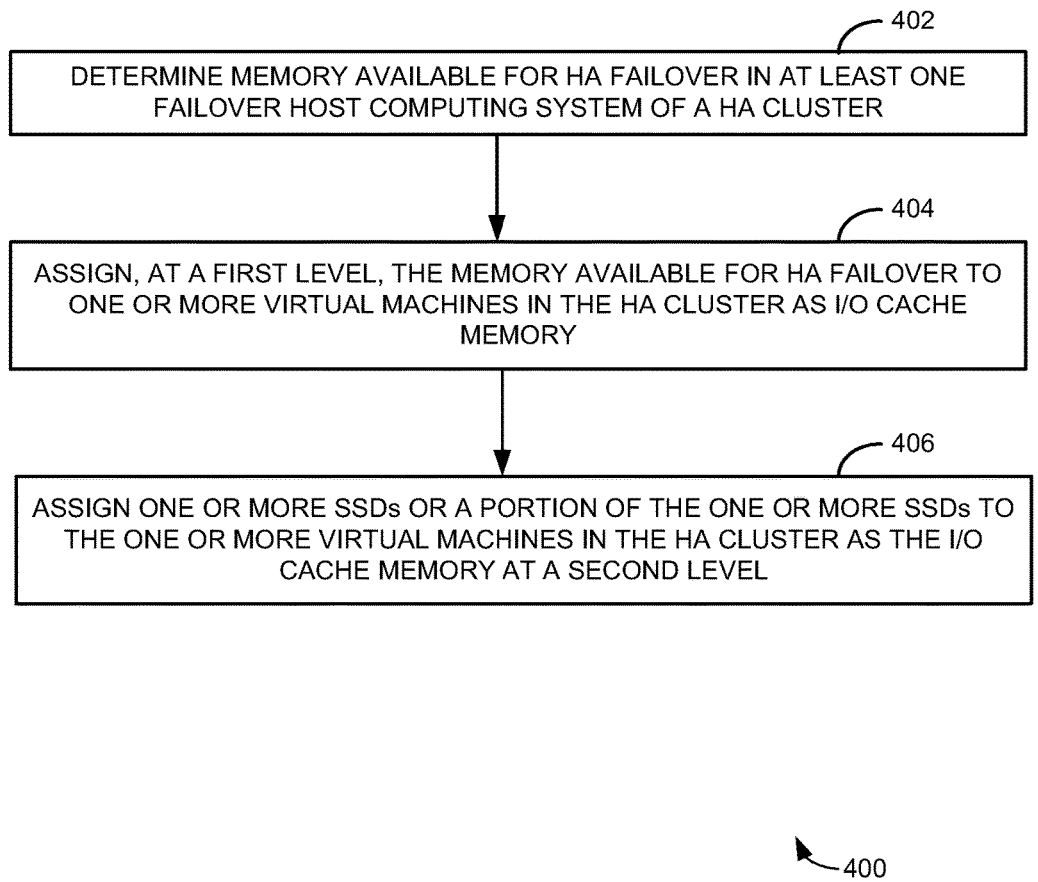
FIG. 4 illustrates a flow diagram for assigning memory available for HA failover and SSDs to virtual machines as I/O cache memory at different levels, according to an example embodiment.

FIG. 4 illustrates flow diagram 400 for assigning memory available for high availability (HA) failover and solid-state drives (SSDs) to virtual machines as input/output (I/O) cache memory at different levels according to an example embodiment. At step 402, memory available for HA failover is determined in one or more failover host computing systems of a HA cluster. For example, a failover policy may be used to define the failover host computing systems in the HA cluster to accommodate the virtual machines in the event of HA failover (i.e., failure of one or more host computing systems). Further, the memory available for HA failover is the memory reserved on the failover host computing systems to accommodate affected virtual machines in the event of HA failover.

At step 404, the memory available for HA failover is assigned to one or more virtual machines in the HA cluster as I/O cache memory at a first level. In one exemplary implementation, the memory available for HA failover is assigned remotely to the virtual machines as the I/O cache memory using a connection (e.g., remote direct memory access (RDMA)-enabled network connection, any available host bus interconnect hardware, and so on) to the failover host computing systems having the memory available for HA failover. For example, a resource scheduling mechanism assigns a portion of the memory available for HA failover to each of the virtual machines as the I/O cache memory based on requirements of the virtual machines and availability of the memory in the failover host computing systems.

At step 406, the SSDs or a portion of the SSDs are assigned to the virtual machines in the HA cluster as the I/O cache memory at a second level to provide a 3-tier hierarchical model for the I/O cache memory (e.g., as explained with respect to FIG. 3). For example, if the I/O cache memory assigned from the memory available for HA failover is not sufficient then additional I/O cache memory can also be assigned from the SSDs to improve the I/O performance of the virtual machines.

Figure 5:
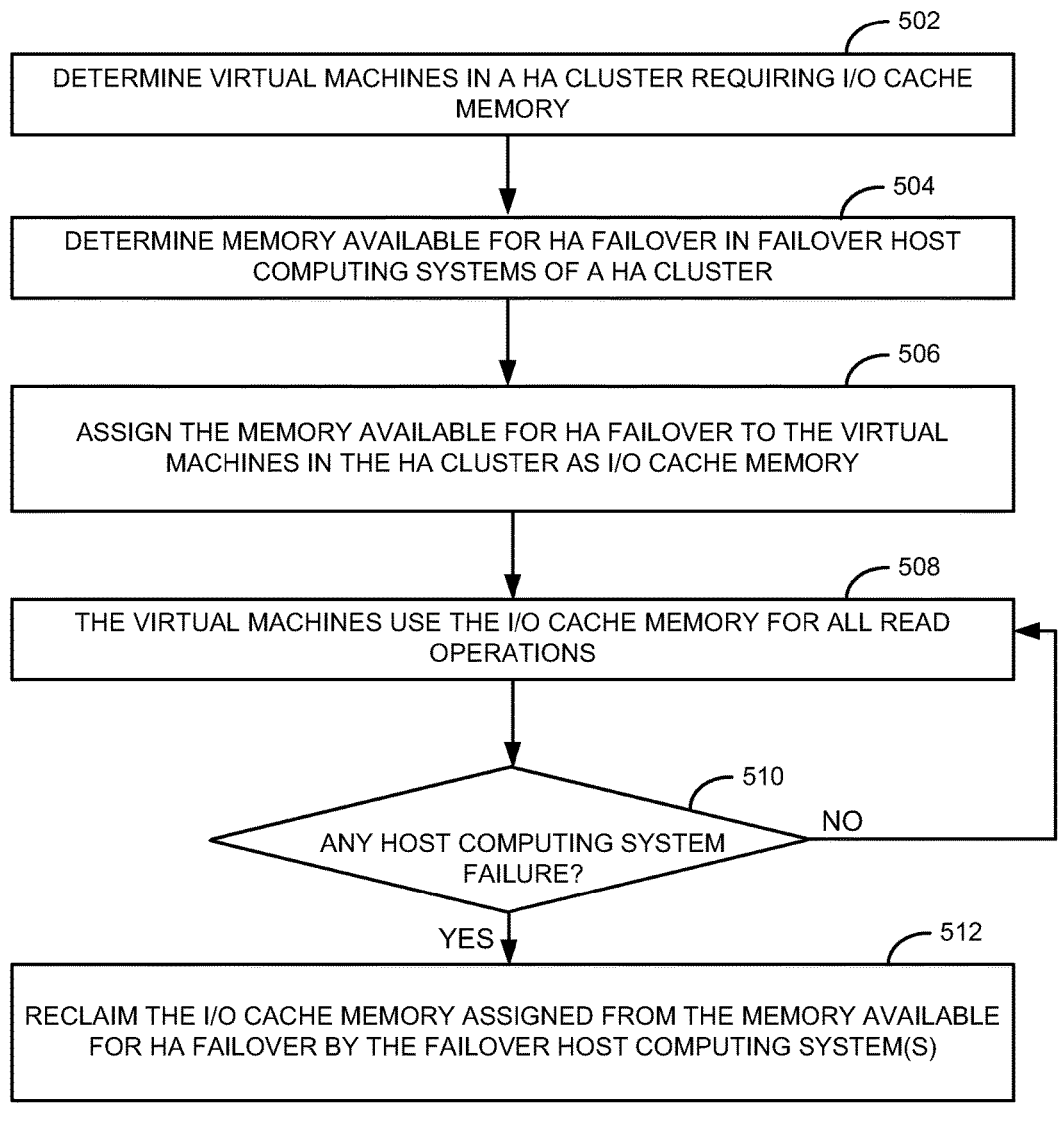
FIG. 5 illustrates another flow diagram for assigning memory available for HA failover to virtual machines in a HA cluster, according to an example embodiment.

FIG. 5 illustrates another flow diagram 500 for assigning memory available for HA failover to virtual machines in the HA cluster according to an example embodiment. Particularly, FIG. 5 also illustrates reclaiming the memory available for HA failover from the virtual machines in the event of HA failover. At step 502, virtual machines in the HA cluster requiring I/O cache memory are determined. For example, a resource scheduling framework configures the virtual machines in the HA cluster for I/O cache memory.

At step 504, the memory available for HA failover is determined in at least one failover host computing system of a HA cluster. For example, a failover policy may be used to define the failover host computing systems including memory available for HA failover to accommodate the virtual machines in the event of HA failover.

At step 506, the memory available for HA failover is assigned to the virtual machines in the HA cluster as the input/output (I/O) cache memory. In one exemplary implementation, a first virtual machine requiring the I/O cache memory is determined in the HA cluster. Further, a check is made to determine whether the memory available for HA failover is sufficient for assigning to the first virtual machine. If the memory available for HA failover is sufficient, the memory available for HA failover is assigned to the first virtual machine as the I/O cache memory. In an example, the memory available for HA failover is assigned remotely to the first virtual machine as the I/O cache memory using a connection (e.g., remote direct memory access (RDMA)-enabled network connection, host bus interconnect hardware, and so on) to the at least one failover host computing system having the memory available for HA failover. If the memory available for HA failover is not sufficient, assigning the memory available for HA failover to the first virtual machine is stopped by notifying that the memory available for HA failover is not sufficient for assigning to the first virtual machine. This process is repeated for all the virtual machines requiring the I/O cache memory.

In one example embodiment, a resource scheduling framework assigns the memory available for HA failover remotely to the virtual machines as the I/O cache memory using remote direct memory access (RDMA)-enabled network connection and/or other interconnection technologies based on requirements of the virtual machines.

At step 508, the virtual machines use the assigned I/O cache memory for all the read operations to improve their I/O performance until a host computing system fails. At step 510, a check is made to determine whether there is a HA failover (i.e., any host computing system failure) in the HA cluster. At step 512, the I/O cache memory assigned to the virtual machines from the memory available for HA failover is reclaimed by the failover host computing systems in the event of the HA failover in the HA cluster.

In one example embodiment, the memory available for HA failover that is assigned as the I/O cache memory is reclaimed from the virtual machines after discarding the I/O cache memory associated with the virtual machines. For example, the I/O cache memory can only be used as a read cache and not a write cache because in case of the failover host computing system failure, the I/O cache memory can be directly discarded. In case of any host computing system failure the I/O cache memory can be discarded to free up the failover host computing system memory which can be used for powering on failed virtual machines. When the HA cluster is back to normal (i.e., the failed host computing system is back to normal or replaced), the I/O cache memory can be dynamically created from the memory available for HA failover in the failover host computing systems.

The systems and methods as described in FIGS. 1-5 improve I/O performance of the virtual machines. For example, the performance of the I/O cache memory created using the memory available for HA failover can be better than the I/O cache memory created using external disks (e.g., SSDs) because the speed of physical memory (i.e., memory reserved for HA failover in the host computing system) is significantly faster than the external disks. The systems and methods as described in FIGS. 1-6 also improve utilization of the memory resources in the HA cluster.

Example Computing System Implementation

Figure 6:
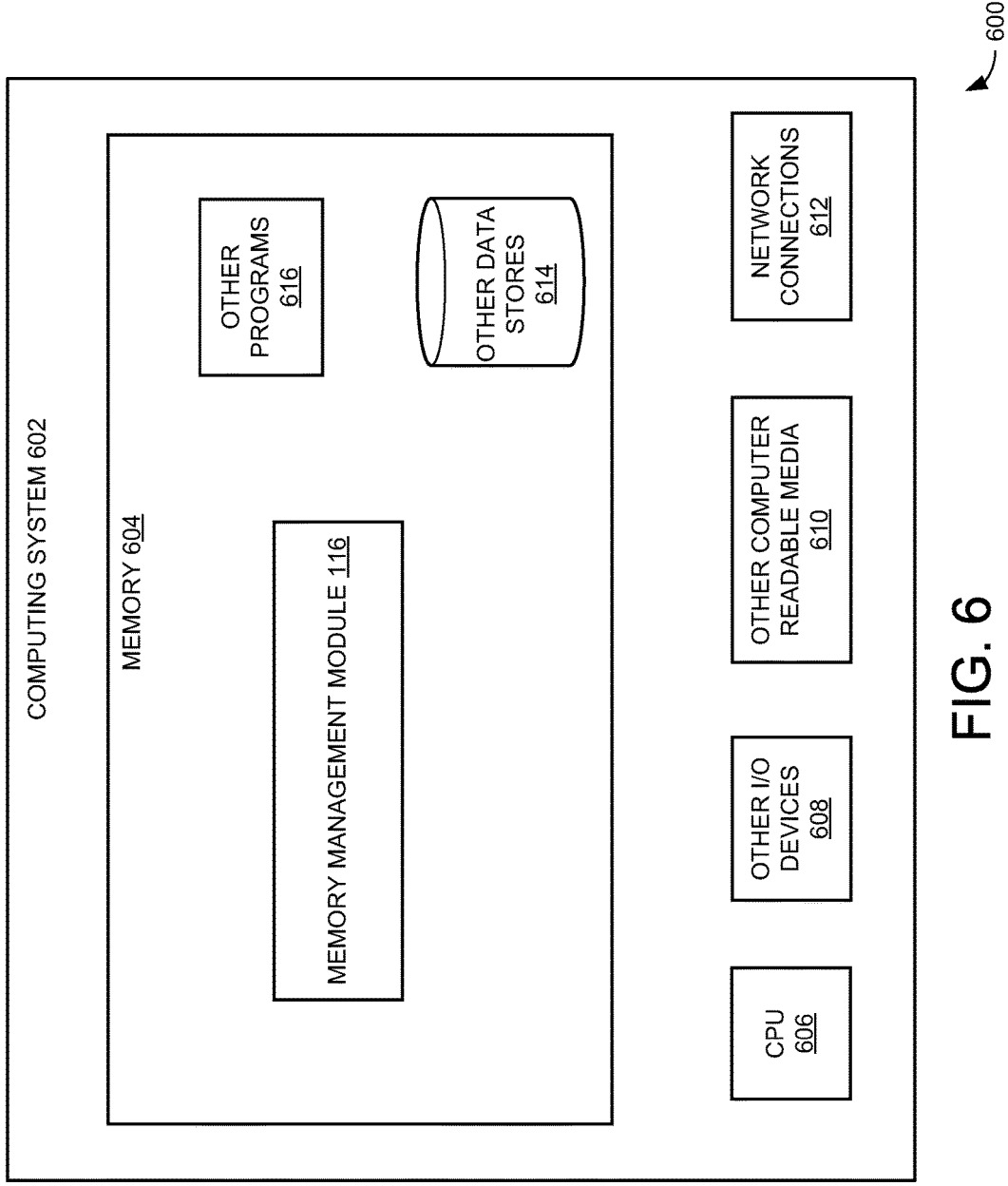
FIG. 6 is a block diagram of an example physical computing system including a memory management module, according to an example embodiment.

FIG. 6 is block diagram 600 of example physical computing system 602 (such as management server 104 shown in FIGS. 1-2) including memory management module (such as memory management module 116 shown in FIGS. 1-2) according to an example embodiment. In particular, FIG. 6 shows physical computing system 602 that may be utilized to implement memory management module 116.

Note that one or more general purpose virtual or physical computer systems suitably instructed may be used to implement memory management module 116. In addition, physical computing system 602 may comprise one or more distinct computing systems/devices and may span distributed locations. Furthermore, each block shown may represent one or more such blocks as appropriate to a specific embodiment or may be combined with other blocks. Also, memory management module 116 may be implemented in software, hardware, firmware, or in some combination to achieve the capabilities described herein.

In the embodiment shown, physical computing system 602 may comprise computer memory ("memory") 604, one or more Central Processing Units ("CPU") 606, input/output devices 608 (e.g., keyboard, mouse, etc.), other computer-readable media 610, and network connections 612. Memory management module 116 is shown residing in memory 604. The components of memory management module 116 may execute on one or more CPUs 606 and implement techniques described herein. Other code or programs 616 (e.g., an administrative interface, a Web server, and the like) and potentially other data repositories, such as data store 614, may also reside in memory 604, and execute on one or more CPUs 606. One or more of the components in FIG. 6 may not be present in any specific implementation. For example, some embodiments may not provide other computer readable media 610. Further, some embodiments may provide a display in physical computing system 602.

Memory management module 116 interact via a network with host computing systems in the HA cluster. The network may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication to and from remotely situated humans and/or devices.

As discussed, memory management module 116 dynamically allocates the memory available for HA failover to the virtual machines in the HA cluster as I/O cache memory at a first level of hierarchy. Further, memory management module 116 dynamically allocates the SSDs to the virtual machines in the HA cluster as the I/O cache memory at a second level of hierarchy.

The components of memory management module 116 may record and/or communicate various types of information, including activity information (e.g., indications of importance, indications of activities occurring on virtual machines, indications of application actions/events and/or virtual machine/desktop states that may be used to determine the occurrence of an activity), resource allocation information (e.g., indications of shares or reservations assigned to particular virtual machines), and the like. Activity information written to data store 614 may be persisted to other computer readable media 610 or to a remote persistent memory storage location (not shown).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of memory management module 116, such as in data store 614, can be available by standard mechanisms such as through C, C++, C#, and Java APIs; libraries for accessing files, databases, or other data repositories; through scripting languages such as XML; or through Web servers, FTP servers, or other types of servers providing access to stored data. Data store 614 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, WebSockets, RPC, RMI, HTTP, web services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of memory management module 116 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a non-transitory computer-readable medium (e.g., as a hard disk; a memory; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

From the foregoing it will be appreciated that, although specific embodiments have been described herein for purposes of illustration, various modifications may be made without deviating from the spirit and scope of this disclosure. For example, the methods, techniques, and systems for dynamic resource allocation are applicable to other architectures or in other settings. For example, the described techniques may be employed as part of a cloud-based computing resource offering, wherein customers may pay to have higher importance levels associated with their activities, in order to obtain higher levels of service or availability. As another example, the described techniques may be employed to allocate resources or schedule CPU time at the process level within an operating system. Also, the methods, techniques, and systems discussed herein are applicable to differing protocols, communication media (optical, wireless, cable, etc.) and devices (e.g., desktop computers, wireless handsets, electronic organizers, personal digital assistants, tablet computers, portable email machines, game machines, pagers, navigation devices, etc.).

The invention claimed is:

1. A method for assigning memory available for high availability (HA) failover, comprising:
   determining the memory available for HA failover in at least one failover host computing system of a HA cluster, wherein the memory available for HA failover is memory available on the at least one failover host computing system to accommodate affected virtual machines in an event of HA failover, wherein the HA failover is a failure of at least one host computing system that is different from the at least one failover host computing system, and wherein the at least one failover host computing system is designated to accommodate the affected virtual machines associated with the at least one failed host computing system in the HA cluster; and
   assigning, at a first level, the memory available for HA failover to one or more virtual machines running on the at least one host computing system in the HA cluster as input/output (I/O) cache memory when there is no failure of the at least one host computing system, wherein the memory available for HA failover is assigned using a remote connection from the one or more virtual machines running on the at least one host computing system to the at least one failover host computing system.

2. The method of claim 1, wherein assigning the memory available for HA failover to the one or more virtual machines in the HA cluster as the I/O cache memory comprises:
   determining a first virtual machine in the HA cluster requiring the I/O cache memory;
   determining whether the memory available for HA failover is sufficient for assigning to the first virtual machine;
   if the memory available for HA failover is sufficient, assigning the memory available for HA failover to the first virtual machine as the I/O cache memory; and
   if the memory available for HA failover is not sufficient, notifying that the memory available for HA failover is not sufficient for assigning to the first virtual machine.

3. The method of claim 2, further comprising:
   repeating the steps of claim 2 for each virtual machine requiring the I/O cache memory.

4. The method of claim 2, wherein assigning the memory available for HA failover to the first virtual machine as the I/O cache memory, comprises:
   assigning the memory available for HA failover remotely to the first virtual machine as the I/O cache memory using a connection to the at least one failover host computing system having the memory available for HA failover.

5. The method of claim 4, wherein assigning the memory available for HA failover remotely to the first virtual machine as the I/O cache memory using the connection to the at least one failover host computing system, comprises:
   assigning the memory available for HA failover remotely to the first virtual machine as the I/O cache memory using a remote direct memory access (RDMA)-enabled network connection or a host bus interconnect hardware.

6. The method of claim 1, wherein the memory available for HA failover is assigned to the one or more virtual machines in the HA cluster as the I/O cache memory using a resource scheduling framework.

7. The method of claim 1, wherein assigning the memory available for HA failover to the one or more virtual machines as the I/O cache memory, comprises:
   assigning a portion of the memory available for HA failover to each of the one or more virtual machines as the I/O cache memory based on requirements of the one or more virtual machines.

8. The method of claim 1, further comprising:
   reclaiming the I/O cache memory assigned from the memory available for HA failover by the at least one failover host computing system in the event of HA failover in the HA cluster.

9. The method of claim 8, wherein reclaiming the I/O cache memory comprises:
   discarding the I/O cache memory associated with the one or more virtual machines; and
   reclaiming the memory available for HA failover from the one or more virtual machines by the at least one failover host computing system upon discarding the I/O cache memory.

10. The method of claim 1, further comprising:
    assigning one or more solid-state drives (SSDs) or a portion of the one or more SSDs to the one or more virtual machines in the HA cluster as the I/O cache memory at a second level.

11. A system comprising:
    one or more high availability (HA) clusters, each HA cluster comprising:
        a plurality of host computing systems with each host computing system including virtual machines running therein; and
        at least one failover host computing system including memory available for HA failover; and a management server communicative with the one or more clusters, wherein the management server includes a memory management module to:
   determine memory available for HA failover in the at least one failover host computing system of a HA cluster of the one or more HA clusters, wherein the memory available for HA failover is memory available on the at least one failover host computing system to accommodate affected virtual machines in an event of HA failover, wherein the HA failover is a failure of at least one host computing system that is different from the at least one failover host computing system, and wherein the at least one failover host computing system is designated to accommodate the affected virtual machines associated with the at least one failed host computing system in the HA cluster; and
   assign, at a first level, the memory available for HA failover to one or more virtual machines running on the at least one host computing system in the HA cluster as input/output (I/O) cache memory when there is no failure of the at least one host computing system, wherein the memory available for HA failover is assigned using a remote connection from the one or more virtual machines running on the at least one host computing system to the at least one failover host computing system.

12. The system of claim 11, wherein the memory management module is further configured to:
   determine a first virtual machine of the one or more virtual machines in the HA cluster requiring the I/O cache memory;
   determine whether the memory available for HA failover is sufficient for assigning to the first virtual machine;
   assign the memory available for HA failover to the first virtual machine as the I/O cache memory if the memory available for HA failover is sufficient; and
   notify that the memory available for HA failover is not sufficient for assigning to the first virtual machine if the memory available for HA failover is not sufficient.

13. The system of claim 12, wherein the memory management module is further configured to:
   repeat the steps of claim 12 for each virtual machine requiring the I/O cache memory.

14. The system of claim 12, wherein the memory management module assigns the memory available for HA failover remotely to the first virtual machine as the I/O cache memory using a connection to the at least one failover host computing system having the memory available for HA failover.

15. The system of claim 14, wherein the memory management module assigns the memory available for HA failover remotely to the first virtual machine as the I/O cache memory using a remote direct memory access (RDMA)-enabled network connection or a host bus interconnect hardware.

16. The system of claim 11, wherein the memory management module assigns a portion of the memory available for HA failover to each of the one or more virtual machines as the I/O cache memory based on requirements of the one or more virtual machines.

17. The system of claim 11, wherein the memory management module is further configured to:
   reclaim the I/O cache memory assigned from the memory available for HA failover in the event of HA failover in the HA cluster.

18. The system of claim 17, wherein the memory management module is further configured to:
   discard the I/O cache memory associated with the one or more virtual machines; and
   reclaim the memory available for HA failover from the one or more virtual machines to the at least one failover host computing system upon discarding the I/O cache memory.

19. The system of claim 11, further comprising:
   one or more solid-state drives (SSDs), wherein the memory management module assigns the one or more SSDs or a portion of the one or more SSDs to the one or more virtual machines in the HA cluster as the I/O cache memory at a second level.

20. A non-transitory computer-readable storage medium including instructions that are configured, when executed by a computing system, to perform a method for assigning memory available for high availability (HA) failover, the method comprising:
   determining the memory available for HA failover in at least one failover host computing system of a HA cluster, wherein the memory available for HA failover is memory available on the at least one failover host computing system to accommodate affected virtual machines in an event of HA failover, wherein the HA failover is a failure of at least one host computing system that is different from the at least one failover host computing system, and wherein the at least one failover host computing system is designated to accommodate the affected virtual machines associated with the at least one failed host computing system in the HA cluster; and
   assigning, at a first level, the memory available for HA failover to one or more virtual machines running on the at least one host computing system in the HA cluster as input/output (I/O) cache memory when there is no failure of the at least one host computing system failure, wherein the memory available for HA failover is assigned using a remote connection from the one or more virtual machines running on the at least one host computing system to the at least one failover host computing system.

21. The non-transitory computer-readable storage medium of claim 20, wherein assigning the memory available for HA failover to the one or more virtual machines in the HA cluster as the I/O cache memory comprises:
   determining a first virtual machine in the HA cluster requiring the I/O cache memory;
   determining whether the memory available for HA failover is sufficient for assigning to the first virtual machine;
   if the memory available for HA failover is sufficient, assigning the memory available for HA failover to the first virtual machine as the I/O cache memory; and
   if the memory available for HA failover is not sufficient, notifying that the memory available for HA failover is not sufficient for assigning to the first virtual machine.

22. The non-transitory computer-readable storage medium of claim 21, further comprising instructions for:
   repeating the steps of claim 21 for each virtual machine requiring the I/O cache memory.

23. The non-transitory computer-readable storage medium of claim 21, wherein assigning the memory available for HA failover to the first virtual machine as the I/O cache memory, comprises:
   assigning the memory available for HA failover remotely to the first virtual machine as the I/O cache memory using a connection to the at least one failover host computing system having the memory available for HA failover.

24. The non-transitory computer-readable storage medium of claim 23, wherein assigning the memory available for HA failover remotely to the first virtual machine as the I/O cache memory using the connection to the at least one failover host computing system, comprises:

assigning the memory available for HA failover remotely to the first virtual machine as the I/O cache memory using a remote direct memory access (RDMA)-enabled network connection or a host bus interconnect hardware.

25. The non-transitory computer-readable storage medium of claim 20, wherein the memory available for HA failover is assigned to the one or more virtual machines in the HA cluster as the I/O cache memory using a resource scheduling framework.

26. The non-transitory computer-readable storage medium of claim 20, wherein assigning the memory available for HA failover to the one or more virtual machines as the I/O cache memory, comprises:

assigning a portion of the memory available for HA failover to each of the one or more virtual machines as the I/O cache memory based on requirements of the one or more virtual machines.

27. The non-transitory computer-readable storage medium of claim 20, further comprising instructions for:

reclaiming the I/O cache memory assigned from the memory available for HA failover by the at least one failover host computing system in the event of HA failover in the HA cluster.

28. The non-transitory computer-readable storage medium of claim 27, wherein reclaiming the I/O cache memory comprises:

discarding the I/O cache memory associated with the one or more virtual machines; and reclaiming the memory available for HA failover from the one or more virtual machines by the at least one failover host computing system upon discarding the I/O cache memory.

29. The non-transitory computer-readable storage medium of claim 20, further comprising instructions for:

assigning one or more solid-state drives (SSDs) or a portion of the one or more SSDs to the one or more virtual machines in the HA cluster as the I/O cache memory at a second level.

* * * * *